Nov. 16, 1954     B. E. LUBOSHEZ     2,694,226
DEVICE FOR MAKING PROJECTION SCREENS
Original Filed Nov. 22, 1947     2 Sheets—Sheet 1

BENJAMIN E. LUBOSHEZ
INVENTOR
BY
ATTORNEYS

Nov. 16, 1954 B. E. LUBOSHEZ 2,694,226
DEVICE FOR MAKING PROJECTION SCREENS
Original Filed Nov. 22, 1947 2 Sheets-Sheet 2

BENJAMIN E. LUBOSHEZ
INVENTOR
BY
ATTORNEYS

United States Patent Office 2,694,226
Patented Nov. 16, 1954

2,694,226

DEVICE FOR MAKING PROJECTION SCREENS

Benjamin E. Luboshez, Rochester, N. Y., assignor to Eastman Kodak Company, Rochester, N. Y., a corporation of New Jersey Original application November 22, 1947, Serial No. 787,580, now Patent No. 2,618,198, dated November 18, 1952. Divided and this application May 1, 1952, Serial No. 285,564

4 Claims. (Cl. 18—10)

The present invention relates to projection screens, and more particularly to the type known as daylight rear projection screens.

This application is a division of Serial 787,580, filed November 22, 1947, now Patent No. 2,618,198.

Non-reflecting projection screens for viewing in bright light must transmit a maximum amount of light that is received from the projector, while at the same time reflecting only a minimum amount of the stray light striking the surface of the screen facing the observers. Furthermore, it is highly desirable that the angle of "spread" of the useful light coming from the screen to the observers should be greater in a horizontal plane than in a vertical plane, since the observers, grouped about the screen, have their heads at approximately the same level, but may be distributed over a wide arc horizontally. Thus, for example, in practice, the rays from the screen may be required to spread over an angle of say 30 degrees in the horizontal plane, while an angle of 15 degrees may be sufficient in the vertical plane. All of the light received by the screen from the projector should, therefore, be directed to cover only the regions where the observers will be located if each observer is to receive the maximum amount of light available, and if none is to be wasted.

The present invention has, as its broadest aspect, a rear projection screen formed with two separate and distinct groups of parallel cylindrical lenses which are usually arranged at right angles; but, as explained hereafter, for a specific purpose, may be set at some other angle. The important feature of the screen of the present invention is, however, that both groups of lenses face towards the projector. Furthermore, the two groups may be dimensioned so as to provide the same or different relative apertures. A masking screen of opaque material is positioned at the focus of each group of lenses, and is provided with a light-transmitting portion at the focus, as will be apparent from an inspection of the drawings, and as will be hereinafter more fully described.

The present invention has, therefore, as its principal object, the provision of a rear projection screen formed with two groups of angularly arranged cylindrical lenses with both groups facing the projector.

A further object of the invention is the provision of a screen of the type described and with the lenses arranged as above pointed out and with the lens groups dimensioned to provide the same or different relative apertures.

Still another object of the invention is the provision of a screen which comprises two transparent members, each of which has a surface thereof formed with a group of parallel cylindrical lenses, the lenses of one group being angularly arranged relative to the other group and in contact with the smooth face of the other member.

Yet another object of the invention is the provision of a screen formed with a light-transmitting member, one surface of which is formed with two separate groups of angularly arranged parallel cylindrical lenses with the same or different relative apertures.

And another object of the invention is the provision of a device for accurately forming parallel cylindrical lens elements which are exact duplicates.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
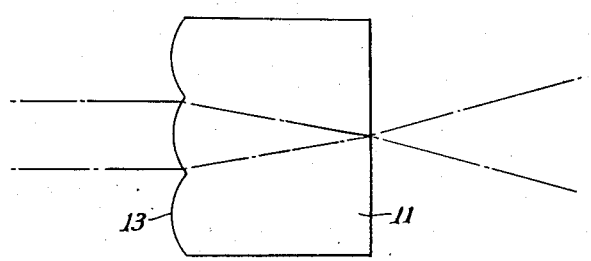
Fig. 1 is a greatly enlarged plan view of a portion of one element of the preferred form of screen.
Figure 2:
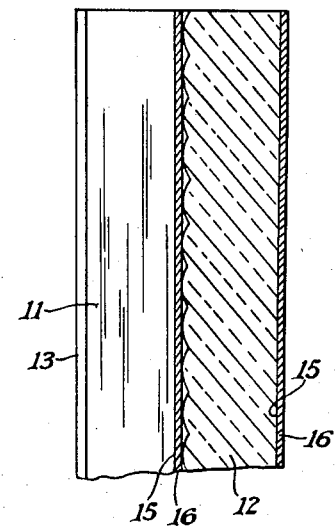
Fig. 2 is a vertical sectional view of the two-element screen of the present invention, showing the relation of the two groups of lenses.
Figure 3:
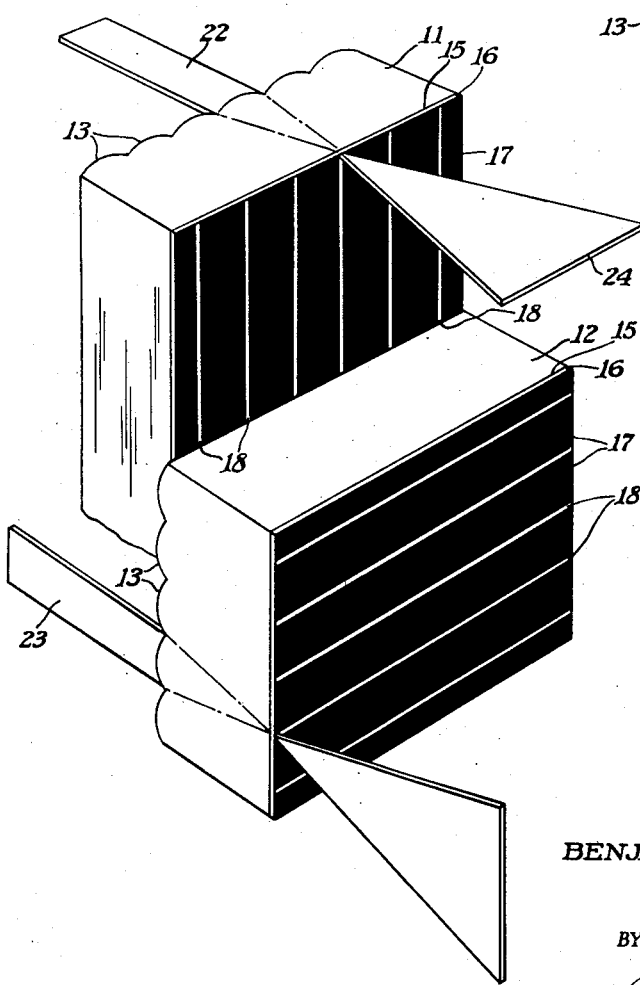
Fig. 3 is a view of the two-element screen shown in Fig. 2 with the elements displaced vertically to show the separate effects of the two lens groups on two light beams.

Fig. 2 shows the preferred form of screen which is made up of two plates 11 and 12 of glass, plastic, or any other suitable transparent material. As each plate is identical in structure, only one will be described in detail, and corresponding parts of the other will be designated by the same numerals. For example, the plate 11 has a front face formed, in a manner to be later described, with a plurality of parallel cylindrical lens elements 13. On the other hand, the rear or smooth surface 15 of the plate is coated with a masking layer 16 in the form of a sensitized photographic emulsion. After coating, this emulsion layer is exposed to a small source of light positioned on the side of the plate 11 facing the lenses 13 or on the left side, see Figs. 2 and 3, at the position normally occupied by the projection lamp so that the exposing light passes through the lenses 13 and is brought to a focus at the coating 16 which is spaced from the lenses a distance equal to the focal length thereof. During this exposure, the light source may be moved back and forth over a short distance, in a manner and for the reason explained in the Holmes et al. Patent No. 2,357,070, issued September 12, 1944, to which reference may be had.

The plate 11 is then processed by a well-known reversal photographic process with the result that the main portion 17 of the coating on the glass is opaque; but, since the foci of the lenses 13 extend vertically, vertical transparent lines or light-transmitting areas 18 are formed, one such area being positioned behind each lens 13 at the focus thereof. These lines or areas are in the exact position necessary to let through all the light from a projector light source situated at the distance and position of the exposing lamp. The plate 12 is then formed and processed in the same manner as the plate 11 so as to provide a pair of plates, each of which has a plurality of groups of parallel cylindrical lenses 13 on one surface thereof, and an opaque masking coating with light-transmitting areas on the other or smooth surface, and at the foci of the lenses, as clearly illustrated in Figs. 2 and 3.

This method of procedure eliminates all possibility of the finished screen exhibiting the highly objectionable feature of a "hot spot" near the center of the screen. The two plates 11 and 12 are then united, with the lens elements 13 of plate 12 being positioned in contact with the coated surface 15 of plate 11, and with the lenses 13 of plate 12 arranged substantially normal to the lenses 13 of plate 11. In the embodiment shown in Fig. 3, the two groups of lenses on the plates 11 and 12 are arranged at right angles. The assembled screen is then positioned so that both lens groups face the light source of the projector. This light source may be considered made up of a group of horizontal bands of light 22 and a group of vertical bands 23, one of each of the imaginary bands being shown in Fig. 3. The horizontal band 22 passes through one of the vertically-arranged lenses 13 on plate 11 and is brought to a sharp focus by the lens 13 at the transparent area 18 thereof, and then tends to spread or fan out, as shown at 24. If the plates 12 were not in position, a continuous vertical column of horizontal bands, such as 22, would issue from each area 18 as a continuous vertical wedge of light with the apex along the vertical line 18. However, as the lenses 13 of plate 12 engage the portion 16 of plate 11, the vertical wedge of light formed by each lens 13 of plate 11 is picked up by lenses 13 of plate 12 and is broken up and focused on the appropriate regions of the areas 18 of plate 12. A vertical axial band, such as 23, passes, of course, through the lenses 13 of plate 11 unaltered and on through the areas 18 thereof, while adjacent non-axial vertical bands are bent on passage through the vertical lenses 13 of plate 11 so as to issue from the transparent lines 18, as explained above. The lenses of plate 12 then pick up the band 23 and adjacent vertical bands to bring them to a focus at the area 18 of plate 12. Thus, each plate serves to bring one of the series of bands to a focus with the result that the light fans out both horizontally and vertically from the plurality of parallel transparent lines at the areas 18 of plate 12. Although the bands 22 and 23 have been shown in the diagram as parallel rays, it will be realized that in practice the light from the projector proceeds from a point at a finite distance so that the incident rays are slightly divergent. It will be evident that even when this divergence is considerable the argument still holds provided the lenses 13 are designated to converge the incident rays to focus on the flat surfaces 15.

By means of this arrangement, all of the light received by the plate 11 is directed through the various transparent lines or areas 18 thereof, and all of this light is picked up by the second plate 12 and directed to its transparent areas 18. Thus, apart from the small loss in absorption and reflection, the combined plate transmits all the light that is received from the projected light source. At the same time, the observers are confronted by the black matte surface 17 on the plate 12 with only the minute transparent areas 18 capable of reflecting a small percentage of extraneous light which will be incident thereon. As the area of lines 18 involved is very small and is a small part of the total area of the coating 16 of plate 12, and, furthermore, as this small area can only reflect a few percent of what it receives, the screen given brilliant contrasty images free from reflections even in full daylight.

If the lens elements of the two plates are identical, and the plates are disposed with the elements running at right angles to each other, the angle of "spread" is, of course, the same in the horizontal and vertical planes. According to a preferred method of controlling the angle of spread, the two screens are made with lenticular cylindrical elements having different aperture ratios. Thus, the screen may be of the same thickness and the same material and the curvatures (and hence the focal lengths) of the elements may be the same so that both bring parallel incident rays to a focus on the photographic layer 16, as is necessary in all cases, but the relative aperture of one set is arranged to be less than that of the other. This means, of course, that there are more lenticular elements per inch, measured across them, in one case than in the other. In practice, the screen having the cylindrical elements of greatest relative aperture would be disposed with its elements running vertically and that with the elements of lower relative aperture would be disclosed with the elements running horizontally.

Figure 4:
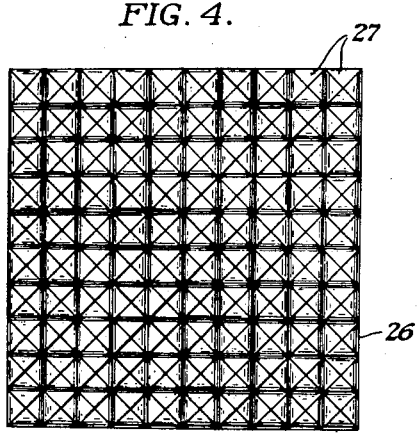
Fig. 4 is a front view of a modified form of the screen.
Figure 5:
Fig. 5 is a rear view of the portion of the screen illustrated in Fig. 4.
Figure 6:
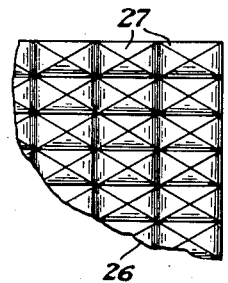
Fig. 6 is a front view of a portion of another modified form of the screen.

According to another form of the invention, both series of lens elements may be formed or impressed on the same side of a single plate 26 so as to cross each other at right angles, as shown in Figs. 4 and 6, the plate 26 being coated on its opposite or smooth side with a coating 16, as described above. This coating is then exposed and processed to provide a series of small transparent areas at the combined foci of the two lens groups. In this arrangement, the coating would have a plurality of small transparent areas 25 rather than parallel lines or areas 18 of the two-plate screen above described. In the case of a single plate screen, the lenses would take the form of closely packed minute pin-cushions 27 formed by the inner sections of the two cylindrical lens systems. If the groups of lenses are of the same size, the pin cushions would be square, as shown in Fig. 4, and the light areas 25 would be square, as shown in Fig. 5; but, if the two groups are of different sizes and hence different relative apertures, the pin cushions would be oblong, as shown in Fig. 6, and the light areas at the rear of the screen would be similarly shaped.

In the structure shown in Fig. 4, the horizontal and vertical spread of the light emerging from the screen would be the same. However, with the lens arrangement shown in Fig. 6, in which the two systems have different relative apertures, the vertical and horizontal spreads will be different. The lenses with the deepest curvatures will give greater spread. The angle of "spread" in vertical and horizontal planes may also be differently controlled, even when both systems of cylindrical lenses are of identical aperture, by crossing the two systems at angles other than right angles to each other and disposing the screen symmetrically with regard to a horizontal or vertical plane.

Figure 7:
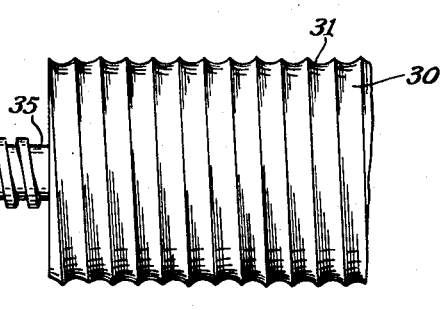
Fig. 7 is a side elevation view of a roller for forming the lens elements on the screens.
Figure 8:
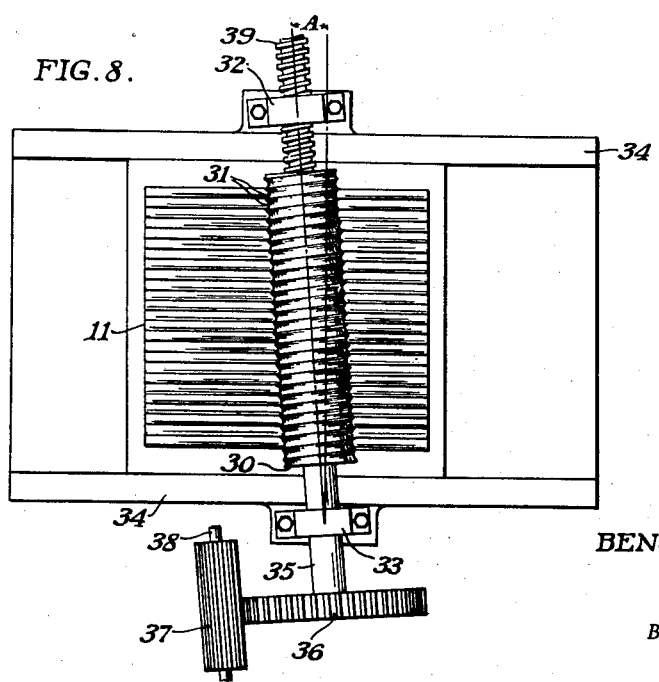
Fig. 8 is a plan view showing the relation of the roller to the plate upon which the lens elements are to be formed.

The lens elements 13 and 27 may be formed on the plates 11, 12 and 26 by molding or pressure, but due to the minute sizes of the lenses, it is difficult to correctly form a mold in which all the lens elements will be exactly the same, or to form them upon long bands or strips of material. It has been found that these lenses may be easily, readily and inexpensively formed by rolling a suitably shaped thread over the surface of the plate or over the surface of a long strip of material on which the lens elements are to be formed. To secure this result, the present invention provides a cylindrical roller 30, the periphery of which is formed with a continuous thread 31, the pitch of which is equal to the spacing of the lens elements and the contour of which is that of the periphery of the lens elements. Such a thread can be accurately made and all parts will be identical. Such a roller is shown in Figs. 7 and 8, and it is mounted in a pair of bearings 32 and 33 carried by a support 34 on which is positioned a plate 11 adapted to receive an impression of the thread 31 which forms the lenses 13. One end of the roller shaft 35 has secured thereto a gear 36 which meshes with a pinion 37 carried by a shaft 38 connected to a source of power, not shown, so that as the pinion 37 is rotated, the roller, in turn, will roll the thread 31 over the plate. As the roller is turned, the support is moved, by means not shown, to gradually pass the plate under the roller.

In order that the thread 31 may be effective to form parallel cylindrical lenses on the surface of the plate, the roller is inclined at a slight angle from the normal to the direction of movement of the plate. In other words, if the plate is moved to the right, as shown in Fig. 8, the roller is inclined to the left of the vertical at an angle A, the amount of inclination being equal to the helix angle of the thread 31. Also, the end of the shaft 35 supported in the bearing 32 is formed with a thread 39 of the same pitch as thread 31, bearing 32 being similarly threaded to receive the thread 39. The result is that as the inclined roller is rotated, the thread 39 and the bearing 32 serve also to move this roller axially. Thus, the roller is simultaneously rotated and moved in an axial direction. In order to permit such axial movement, the face on the pinion 37 is made wide, as shown in Fig. 8. By making the threads 31 and 39 of the same pitch and inclining the roller, as shown, each revolution of the roller will bring successive portions of the thread 31 into engagement with aligned sections of the plate to form a plurality of parallel cylindrical lens elements. As the thread 31 can be accurately formed and all parts thereof will be exactly the same, the lenses formed thereby also will be exact duplicates, the advantage of which will be readily apparent.

After the plate has the lenses formed thereon, this plate can be removed and replaced by a new plate. For manufacturing reasons, it is sometimes convenient to have the plate 11, as well as plate 12, in the form of a long strip of plastic material which can be kept in rolls, pulled through under the roller 30 to form the cylindrical lens elements, and then cut into the requisite length and the balance rolled up again for storage. If, however, a single plate screen is to be formed, as shown in Figs. 4 and 6, the plate, after having one group of lenses formed thereon, may be turned at the proper angle relative to the roller, and the roller is again rotated over the plate to form a second group of lens over the previously formed group. If the two groups of lenses are of the same size, then the same roller may be used to form both groups. However, if the two groups are of different size and of different relative apertures, then different rollers and threads of different pitch and size must be used to form the two groups of lenses. Thus, two groups of parallel cylindrical lenses will be readily, easily and inexpensively formed, and the lenses in the group are exact duplicates.

The present invention thus provides a screen formed with two separate groups of parallel cylindrical lenses, both of which face the projection light source. These groups may be formed on separate plates, or they may be formed on the same face of a single plate. Also, the groups may be arranged at a desired angular relation to each other, and may be of the same or different sizes. Furthermore, the lenses are formed with a device which insures that the lens of each group will be exact duplicates in size and shape.

While certain embodiments of the invention have been disclosed, it is understood that the inventive idea may be carried out in a number of ways. This application is, therefore, not to be limited to the precise details described, but is intended to cover all variations and modifications thereof falling within the scope of the appended claims.

I claim:

1. A device for producing a projection screen of light transmitting material having a plurality of parallel cylindrical lenses positioned on one surface thereof, comprising, in combination, a cylindrical roller adapted to be moved in one direction over said surface and in contact therewith, a continuous thread formed on said roller and having a pitch equal to the spacing of said lenses, and means moving said roller in another direction over said surface simultaneously with the movement in said one direction to cause said thread to form parallel cylindrical lenses on said surface.

2. A device for forming a group of parallel cylindrical lenses on the surface of a support comprising, in combination, a cylindrical roller adapted to be rolled relatively in one direction over said surface, a thread formed on said roller and having a pitch equal to the spacing of said lenses and a shape corresponding thereto, said roller being inclined from the normal to said direction by an angle equal to the helix angle of said thread, and means for moving said roller axially simultaneous with the movement thereof in said one direction to cause said thread to form a group of parallel cylindrical lenses on said surface.

3. A device for forming a group of parallel cylindrical lenses on the surface of a support comprising, in combination, a cylindrical roller adapted to be rolled relatively in one direction over said surface, drive means for rolling said roller, a continuous thread formed on said roller of a shape corresponding to the shape of one of said lenses and a pitch equal to the spacing between adjacent lenses, said roller being inclined from a normal to said direction by an angle equal to the helix angle of said thread, a threaded member carried by said roller, a thread on said member of the same pitch as said first thread, and means engaging said second thread to shift said roller axially as it is moved in said one direction to cause said first thread to form parallel cylindrical lenses on said surface.

4. A device for forming a group of parallel cylindrical lenses on the surface of a support, comprising, in combination, a cylindrical roller adapted to be rolled relatively in one direction over said surface, drive means for rolling said roller, a continuous thread formed on said roller of a shape corresponding to the shape of one of said lenses and a pitch equal to the spacing between adjacent lenses, said roller being inclined from a normal to said direction by an angle equal to the helix angle of said thread, a second threaded member carried by and extending axially from one end of said roller, and a fixed threaded member engaging said second threaded member to cause said roller to move axially as it is rolled in said one direction by said drive means to cause said first thread to form a group of parallel cylindrical lenses on said surface and extending in said direction.

References Cited in the file of this patent

UNITED STATES PATENTS

| Number | Name | Date |
|---|---|---|
| 1,855,198 | Oswald | Apr. 26, 1932 |
| 1,996,868 | Heymer | Apr. 9, 1935 |
| 2,562,078 | Winnek | July 24, 1951 |